Patented Dec. 4, 1923.

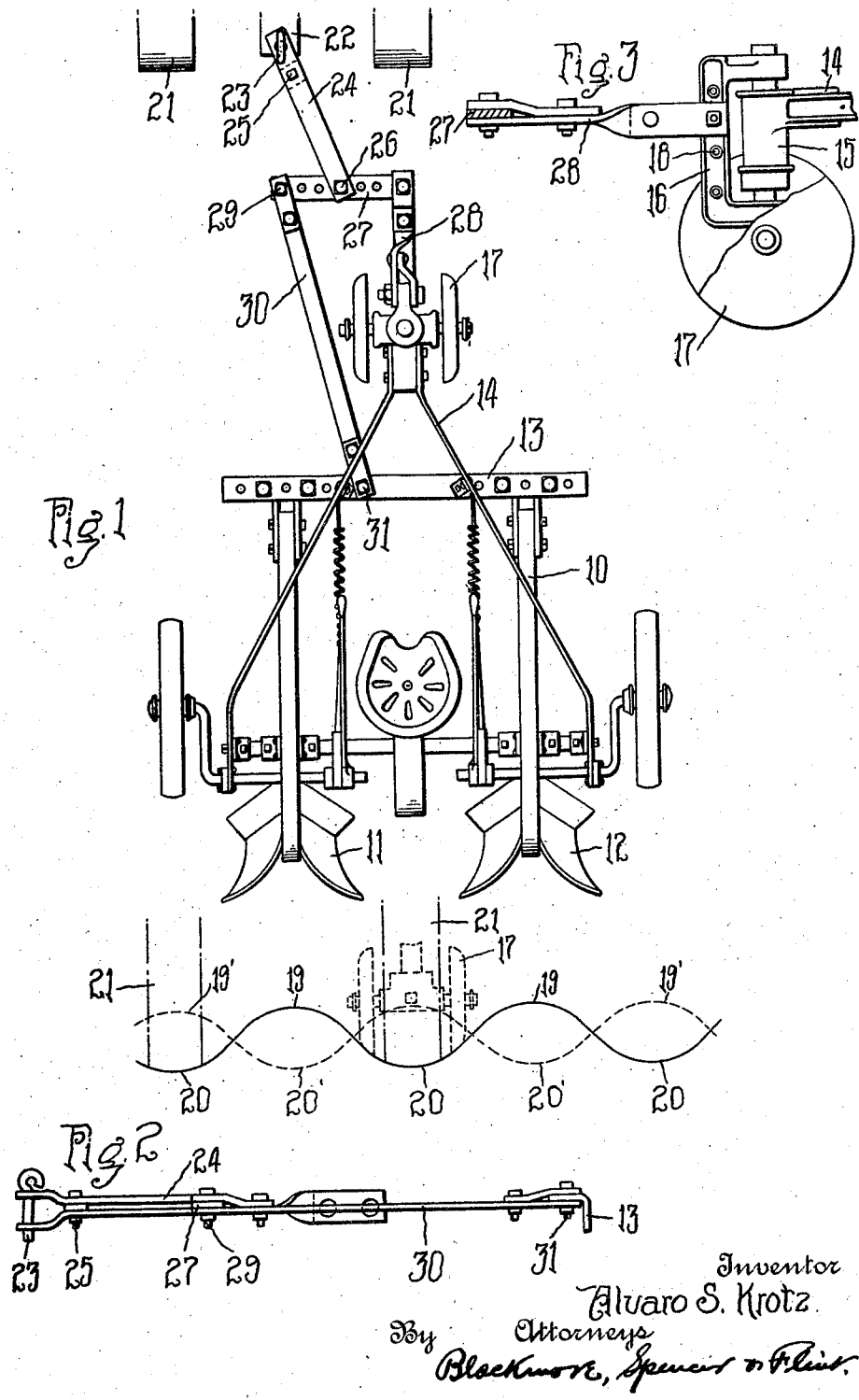

1,475,956

UNITED STATES PATENT OFFICE.

ALVARO S. KROTZ, OF JANESVILLE, WISCONSIN, ASSIGNOR TO GENERAL MOTORS CORPORATION, OF DETROIT, MICHIGAN, A CORPORATION OF DELAWARE.

DRAFT CONNECTION.

Application filed January 5, 1920. Serial No. 349,598.

*To all whom it may concern:*

Be it known that I, ALVARO S. KROTZ, a citizen of the United States, and a resident of Janesville, county of Rock, and State of Wisconsin, have invented certain new and useful Improvements in Draft Connections, of which the following is a full, clear, concise, and exact description, such as will enable others skilled in the art to which the invention relates to make and use the same, reference being made therein to the accompanying drawings, which form a part of this specification.

The invention relates to a draft connection for tractor-drawn implements, and more particularly to means for connecting to a drawing vehicle, as a tractor, an agricultural implement, as a lister or the like, wherein it is necessary to offset the line of draft of the vehicle from that of the drawn implement.

In the operation known as "double-listing", it is customary to go over the ground twice with a lister. the bottoms being so guided in the second listing that they travel in the middle of the ridges formed by the first listing. By this means the surface is much more thoroughly loosened than by a single listing and the character of the seed bed is correspondingly improved.

It has furthermore been proposed to employ tractors in drawing listers, and this practice presents no particular difficulty so far as concerns the first listing. On the second listing, however, with a two-row lister, a material difficulty arises. The ordinary tractor is wide enough to straddle only one ridge, and since it is impracticable to keep the wheels on the tops of the ridges the tractor must travel in the furrows, its center line being thereby offset from the center line of the lister. The lister bottoms are very sensitive to side draft, and must be guided to travel along the center lines of the ridges. Owing therefore to the difficulty above pointed out in regard to the path of the tractor being offset from that of the lister, it has hitherto been found practically impossible to use tractors for this class of work.

It is the primary object of my invention to provide a new form of draft connection whereby a two-row lister or the like may be so attached to a tractor or other drawing vehicle as to travel to one side of the central line of draft of the drawing vehicle.

With this and other objects in view as will fully appear from the following description, the invention consists in certain combinations of parts and elements as more completely hereinafter set forth and definitely pointed out in the claims hereto appended.

In the accompanying drawing:

Fig. 1 is a plan view of a lister, showing its relation to a tractor and to the ground surface.

Fig. 2 is an elevation of the draft connection, and

Fig. 3 is an elevation of the guiding wheels of the lister, showing parts of the draft devices.

In the drawing, 10 indicates a lister having the bottoms 11, 12, suitably connected to a frame member or cross-bar 13. The front end of the frame 14 of the lister is pivotally supported by bearing 15 upon a truck or wheeled frame 16, the wheels 17 of which are gong-shaped as shown to travel in a furrow and serve to guide the main frame. The frame 16 is provided with a plurality of holes 18 for attachment of a clevis or other draft means as usual.

A detailed description of the lister is deemed unnecessary, as the present invention is not concerned with the specific details of the lister itself, and may be employed in connection with any usual or desired construction of two-row lister. It will be sufficient to state that in the first listing the tractor or other draft device may be connected in the usual manner to the frame 16. The first listing will leave the surface in alternate ridges 19 and furrows 20, as represented by full lines in the lower part of Fig. 1. On the second listing the effect will be to produce the surface contour represented in dotted lines, with furrows 20' and ridges 19'. To produce the desired effect it will be necessary, of course, for the bottoms to travel approximately on the center lines of ridges 19, the tractor wheels 21, as indicated by dot and dash lines, traveling in the furrows 20, and the gong wheels 17, as indicated by dotted lines, in the furrow following one of the tractor wheels.

In order to maintain this offset relation between the lister and the tractor I provide a novel form of draft connection. It will be seen that the frame 22 of the tractor is provided with means for receiving the clevis pin 23 by which the draw-bar 24 is secured to the tractor. The draw-bar 24, which may consist of a pair of flat bars suitably secured together, as by bolt 25, is adapted to be secured by bolt 26 to evener 27 provided with a series of holes as shown whereby the point of attachment of draw-bar 24 may be varied to adjust the balancing effect as hereinafter described. One end of evener 27 is attached by a link or clevis bar 28 to the frame 16 of the guiding wheels 17. The clevis bar is shown as formed of flat bars bent in such manner as to receive clevis pins at an angle of 90° to each other. This clevis bar may be attached at any of the holes 18, as will be obvious.

The other end of the evener 27 is provided with a hole to receive bolt 29 by means of which one end of the long link or clevis bar 30 is secured thereto. The clevis bar 30 is secured at the other end by bolt 31 to the cross bar 13 of the lister frame preferably at a point somewhat offset from the center. It will be understood that the various points of connection of the draw-bar, evener, and clevis bars are sufficiently loose to permit free movement of these members during operation.

It is believed that the operation of the invention will be clear from the foregoing description. The pull exerted by the tractor through the draw-bar 24 will be communicated through the evener 27 to the front of wheeled frame 16 and to the cross-frame member 13. Since clevis bar 30 is attached to the rear or main frame and extends at an angle to the line of travel, the tendency of a forward pull will be to cause the linkage system comprising elements 27, 28, and 30 to swing toward the right in Fig. 1, thus swinging the guide or gong wheels 17 to the right. This tendency is counteracted by the lateral pull to the left due to the offset relation of the tractor. Proper proportioning of the lengths of the links of the system and of the points of connection will result in so balancing the operative forces as to cause the guide wheels to travel accurately in line with the furrow. Furthermore, with the arrangement shown, the guide wheels will turn at about the same ratio when the tractor moves to right or left as if the tractor were hitched directly to the front of the frame 16. In the structure as I have herein disclosed it the draw-bar 24 is preferably about half the length of the clevis bar 30, but the proportions of these and other parts are not necessarily limited to those shown. It will be obvious that such factors as the length of evener 27, the relative lengths of the clevis bars, the point of attachment of the frame, and the point of attachment of draw-bar 24 to the evener are all capable of variation to meet changing conditions of side draft or to produce the same effects with various changes of relations of the said factors.

It will be noted that the arrangement shown also offers the advantage of communicating a part of the draft directly to the frame member to which the bottoms are attached, thereby relieving the lister frame from strains to which it would otherwise be subjected.

It will be understood that various changes in the details of construction may be made in addition to those specifically pointed out above without departing from the spirit and scope of the invention and therefore I do not wish to be limited to the specific details above described.

I claim:

1. The combination with a draft device and an implement to be drawn thereby, said implement comprising a pivoted front frame having guiding means adapted to travel in a furrow, of draft connections between said draft device and said implement including a connection to said frame whereby a forward pull may be exerted thereon, said connections being constructed and arranged to cause said guiding means to travel in a furrow offset from the central line of draft of said draft device.

2. The combination with a draft device and an implement to be drawn thereby, said implement comprising a centrally located front frame having guiding means thereon adapted to travel in a furrow, of draft connections between said draft device and said implement comprising connections to said frame and to said implement independently of said frame, said connections being constructed and arranged to cause said guiding means to travel in a furrow offset from the central line of draft of said draft device.

3. The combination with a tractor and an implement to be drawn thereby, said implement comprising a front wheeled frame free to turn about a vertical pivot, of draft connections between said tractor and implement including a connection to the front of said frame arranged to cause said frame to assume a position to guide the implement in a path offset from the central line of draft of the tractor.

4. The combination with an implement comprising a front frame carrying guide wheels, of a draft connection comprising a means attached to the wheeled frame, a means attached to the implement independently of said wheeled frame and means adapted to join both said means to a tractor, the connections being arranged and constructed to guide the implement in a path offset from the line of draft of the tractor.

5. The combination with an implement comprising a main frame and a wheeled guiding frame connected thereto to swing about a vertical pivot, of a draft connection comprising a link attached to the wheeled frame, a link attached to the main frame, and means adapted to connect said links to a tractor, the whole being constructed and arranged to cause the wheeled frame to follow a path offset from the line of draft of the tractor.

6. The combination with an implement comprising a main frame and a wheeled guiding frame pivotally connected thereto, of a draft connection comprising a link attached to the wheeled frame, a link attached to the main frame, an evener connecting said links and a draw-bar adapted to connect said evener to a tractor, the draft connection being arranged and constructed to guide the implement in a line offset from the point of connection of the draw-bar to the tractor.

7. The combination with a tractor and an implement having two earth working devices adapted to operate in ridges, and a guiding device adapted to travel in a furrow between said ridges, of draft connections between said tractor and implement comprising a plurality of links connected to said guiding device and to said implement independently of said guiding device and adapted to maintain said guiding device out of the central line of draft of said tractor and in the path of one of the rear tractor wheels.

In testimony whereof I affix my signature.

ALVARO S. KROTZ.